(12) United States Patent
Hiraiwa et al.

(10) Patent No.: US 10,431,840 B2
(45) Date of Patent: Oct. 1, 2019

(54) MEMBRANE ELECTRODE ASSEMBLY, METHOD FOR MANUFACTURING MEMBRANE ELECTRODE ASSEMBLY, FUEL CELL, AND METHOD FOR MANUFACTURING FUEL CELL

(71) Applicants: SUMITOMO ELECTRIC INDUSTRIES, LTD., Osaka-shi, Osaka (JP); KYUSHU UNIVERSITY, NATIONAL UNIVERSITY CORPORATION, Fukuoka-shi, Fukuoka (JP)

(72) Inventors: Chihiro Hiraiwa, Itami (JP); Masatoshi Majima, Itami (JP); Hiromasa Tawarayama, Itami (JP); Takahiro Higashino, Itami (JP); Yohei Noda, Itami (JP); Naho Mizuhara, Itami (JP); Tatsumi Ishihara, Fukuoka (JP)

(73) Assignees: SUMITOMO ELECTRIC INDUSTRIES, LTD., Osaka-shi, Osaka (JP); KYUSHU UNIVERSITY, NATIONAL UNIVERSITY CORPORATION, Fukuoka-shi, Fukuoka (JP)

( * ) Notice: Subject to any disclaimer, the term of this patent is extended or adjusted under 35 U.S.C. 154(b) by 244 days.

(21) Appl. No.: 15/322,537

(22) PCT Filed: Jun. 23, 2015

(86) PCT No.: PCT/JP2015/067990
§ 371 (c)(1),
(2) Date: Dec. 28, 2016

(87) PCT Pub. No.: WO2016/002579
PCT Pub. Date: Jan. 7, 2016

(65) Prior Publication Data
US 2017/0133699 A1    May 11, 2017

(30) Foreign Application Priority Data

Jul. 1, 2014 (JP) ................................ 2014-135917

(51) Int. Cl.
*H01M 8/1213* (2016.01)
*H01M 4/86* (2006.01)
(Continued)

(52) U.S. Cl.
CPC .......... *H01M 8/1213* (2013.01); *H01M 4/86* (2013.01); *H01M 4/8605* (2013.01);
(Continued)

(58) Field of Classification Search
CPC ....... H01M 2004/8684; H01M 4/8605; H01M 8/1213; H01M 4/86; H01M 4/8621;
(Continued)

(56) References Cited

U.S. PATENT DOCUMENTS

2005/0019636 A1    1/2005  Kwon et al.
2007/0015015 A1*   1/2007  Hoshino .................. C01B 3/38
                                                         429/425
(Continued)

FOREIGN PATENT DOCUMENTS

DE    11 2011 103 324 T5    8/2013
EP         2 851 985 A1     3/2015
(Continued)

OTHER PUBLICATIONS

EPO Search Report dated Oct. 25, 2017 in a counterpart EP application.

*Primary Examiner* — Carlos Barcena
(74) *Attorney, Agent, or Firm* — Drinker Biddle & Reath LLP

(57) ABSTRACT

Provided are a membrane electrode assembly, including a solid electrolyte layer, an anode layer provided on one side
(Continued)

of the solid electrolyte layer, and a cathode layer provided on the other side of the solid electrolyte layer, the anode layer being stacked on the solid electrolyte layer to be pressed thereagainst, the anode layer including a porous anode member having electrical conductivity; and a method for manufacturing the same.

14 Claims, 10 Drawing Sheets

(51) Int. Cl.
　　*H01M 8/12*　　　　(2016.01)
　　*H01M 4/88*　　　　(2006.01)
　　*H01M 8/02*　　　　(2016.01)
　　*H01M 4/90*　　　　(2006.01)
　　*H01M 8/0232*　　　(2016.01)
　　*H01M 8/0245*　　　(2016.01)
　　*H01M 8/0297*　　　(2016.01)
　　*H01M 8/2432*　　　(2016.01)
　　*H01M 8/0234*　　　(2016.01)

(52) U.S. Cl.
　　CPC ....... *H01M 4/8621* (2013.01); *H01M 4/8657* (2013.01); *H01M 4/88* (2013.01); *H01M 4/905* (2013.01); *H01M 4/9075* (2013.01); *H01M 8/02* (2013.01); *H01M 8/0232* (2013.01); *H01M 8/0245* (2013.01); *H01M 8/0297* (2013.01); *H01M 8/12* (2013.01); *H01M 8/2432* (2016.02); *H01M 8/0234* (2013.01); *H01M 2004/8684* (2013.01); *Y02P 70/56* (2015.11)

(58) Field of Classification Search
　　CPC ...... H01M 4/8657; H01M 4/88; H01M 4/905; H01M 4/9075; H01M 8/02; H01M 8/0232; H01M 8/0234; H01M 8/0245; H01M 8/0297; H01M 8/12; H01M 8/2432
　　See application file for complete search history.

(56) References Cited

U.S. PATENT DOCUMENTS

| | | | |
|---|---|---|---|
| 2011/0287279 A1* | 11/2011 | Okuno | H01G 9/008 428/613 |
| 2013/0108947 A1* | 5/2013 | Okuno | H01M 4/86 429/522 |
| 2013/0266862 A1* | 10/2013 | Okuno | B32B 15/01 429/211 |
| 2015/0147674 A1 | 5/2015 | Hiraiwa et al. | |

FOREIGN PATENT DOCUMENTS

| | | | | |
|---|---|---|---|---|
| EP | 3 118 921 A1 | | 1/2017 | |
| EP | 3 128 593 A1 | | 2/2017 | |
| JP | H07-245112 | * | 9/1995 | ............. H01M 4/86 |
| JP | H07-245112 A | | 9/1995 | |
| JP | 2004-355928 A | | 12/2004 | |
| JP | 2007-502012 A | | 12/2004 | |
| JP | 2009-187887 A | | 8/2009 | |
| JP | 2012-099497 A | | 5/2012 | |
| JP | 2014-013694 A | | 1/2014 | |
| WO | WO-2012077550 A1 | * | 6/2012 | ............. B32B 15/01 |
| WO | WO-2013/172182 A1 | | 11/2013 | |

\* cited by examiner

MEMBRANE ELECTRODE ASSEMBLY, METHOD FOR MANUFACTURING MEMBRANE ELECTRODE ASSEMBLY, FUEL CELL, AND METHOD FOR MANUFACTURING FUEL CELL

TECHNICAL FIELD

The present invention relates to a membrane electrode assembly, a method for manufacturing a membrane electrode assembly, a fuel cell, and a method for manufacturing a fuel cell. Specifically, the present invention relates to a membrane electrode assembly and the like capable of improving performance of a fuel cell and capable of reducing the number of parts and manufacturing cost.

BACKGROUND ART

A solid oxide fuel cell (hereinafter referred to as an "SOFC") includes an electrolyte-electrode stacked body having an anode layer and a cathode layer provided on both sides of a solid electrolyte layer. In order to reduce ionic conduction resistance in the solid electrolyte layer, it is considered preferable to form the solid electrolyte layer to have a thickness as thin as possible. On the other hand, when the solid electrolyte layer is thinly formed, the solid electrolyte layer has a reduced strength, which may cause a trouble during a manufacturing process or during use. Accordingly, there is often adopted a structure in which an anode layer to be stacked on a solid electrolyte layer is set to be thick, and the solid electrolyte layer is integrally formed on the anode layer to secure strength as a stacked body (i.e., an anode support structure) [Japanese Patent Laying-Open No. 2012-099497 (PTD 1)].

The electrolyte-electrode stacked body described above is often manufactured by thinly applying electrolyte powder onto an anode layer powder compact and simultaneously firing this electrolyte-anode stacked body.

CITATION LIST

Patent Document

PTD 1: Japanese Patent Laying-Open No. 2012-099497

SUMMARY OF INVENTION

Technical Problem

By adopting the above configuration, the strength of the electrolyte-anode stacked body can be secured, while setting the solid electrolyte layer to have a small thickness. However, due to the high firing temperature of the solid electrolyte layer, members constituting the anode layer and the solid electrolyte layer react at an interface therebetween during firing, causing problems such as a decrease in ionic conductivity and an increase in electric resistance.

Further, when the above configuration of integrally firing the solid electrolyte layer and the anode layer is adopted, it is necessary to match firing behaviors, such as shrinkage rates, between the solid electrolyte layer and the anode layer. Accordingly, combination of materials constituting the solid electrolyte layer and the anode layer is limited, and performance of the fuel cell cannot be improved.

Furthermore, with a conventional technique, steps for manufacturing the above electrolyte-electrode stacked body and the numbers of parts are increased, causing a problem such as an increase in manufacturing cost.

The present invention has been conceived to solve the aforementioned problems, and one object of the present invention is to provide a membrane electrode assembly capable of improving performance of a fuel cell and capable of reducing manufacturing steps and the number of parts, as well as a method for manufacturing the membrane electrode assembly. Further, another object of the present invention is to provide a fuel cell including the membrane electrode assembly, as well as a method for manufacturing a fuel cell including the method for manufacturing the membrane electrode assembly.

Solution to Problem

A membrane electrode assembly in accordance with a first aspect of the present invention is a membrane electrode assembly including a solid electrolyte layer, an anode layer provided on one side of the solid electrolyte layer, and a cathode layer provided on the other side of the solid electrolyte layer, the anode layer being stacked on the solid electrolyte layer to be pressed thereagainst, the anode layer including a porous anode member having electrical conductivity.

A fuel cell in accordance with a second aspect of the present invention includes the membrane electrode assembly in accordance with the first aspect described above.

A method for manufacturing a membrane electrode assembly in accordance with a third aspect of the present invention is a method for manufacturing a membrane electrode assembly including a solid electrolyte layer, an anode layer provided on one side of the solid electrolyte layer, and a cathode layer provided on the other side of the solid electrolyte layer, including the steps of forming the solid electrolyte layer, forming the cathode layer on the other side of the solid electrolyte layer, preparing a porous anode member, and stacking the porous anode member on the one side of the solid electrolyte layer to be pressed thereagainst.

A method for manufacturing a fuel cell in accordance with a fourth aspect of the present invention includes the method for manufacturing the membrane electrode assembly in accordance with the third aspect described above.

Advantageous Effects of Invention

According to the above invention, performance of the fuel cell can be improved, and manufacturing steps and the number of parts can be reduced. Further, manufacturing cost can be reduced.

DESCRIPTION OF EMBODIMENTS

[Description of Embodiment of Present Invention]

Figure 1:
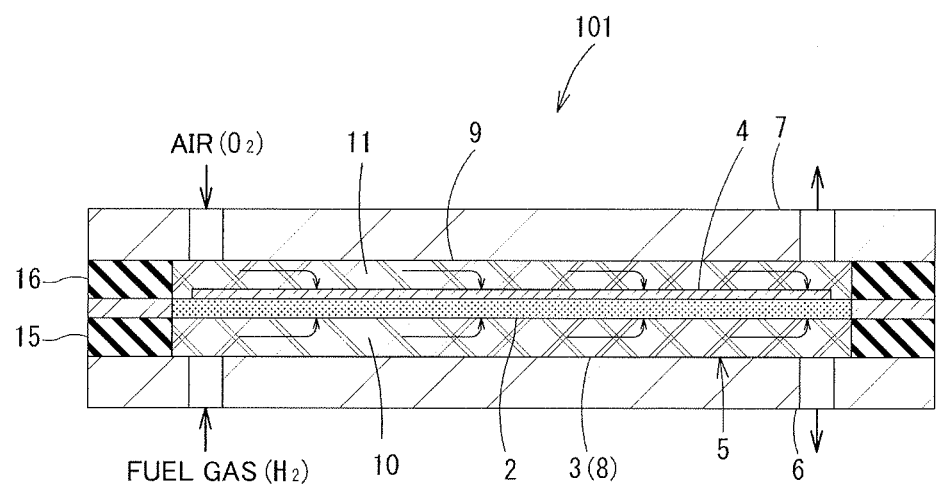
FIG. 1 is a cross sectional view showing a schematic configuration of a fuel cell unit in accordance with one embodiment.

A membrane electrode assembly in accordance with one embodiment of the present invention is a membrane electrode assembly including a solid electrolyte layer, an anode layer provided on one side of the solid electrolyte layer, and a cathode layer provided on the other side of the solid electrolyte layer, the anode layer being stacked on the solid electrolyte layer to be pressed thereagainst, the anode layer including a porous anode member having electrical conductivity.

Since the solid electrolyte layer and the anode layer are not integrally fired in the present embodiment, there occurs no reaction between constituent materials at a boundary surface between these layers during a firing step and the like, preventing an increase in electric resistance and a decrease in ionic conductivity.

Further, since there is no need to fire the solid electrolyte layer together with the anode layer, manufacturing steps can be reduced. Furthermore, since the anode layer can also serve as a current collector, the number of parts can also be reduced.

Furthermore, the solid electrolyte layer and the anode layer are stacked to be pressed against each other. Therefore, even when there is a large difference in thermal expansion coefficient and the like between these members, there is no possibility that a crack or the like resulting from the thermal expansion coefficient and the like may occur as in the case of integral firing, and thus a high-quality fuel cell can be configured.

Moreover, there is also no need to set behaviors during firing, thermal expansion coefficients, and the like of materials constituting the solid electrolyte layer and the anode layer to be identical. Accordingly, the range of choices for the materials constituting the solid electrolyte layer and the anode layer is significantly widened. As a result, the solid electrolyte layer and the anode layer can be formed of optimal materials, and performance of the fuel cell can also be improved.

Since the solid electrolyte layer is generally formed without being held on the anode layer in the present embodiment, the solid electrolyte layer preferably has a predetermined strength. Accordingly, it is preferable to set the solid electrolyte layer to have a thickness somewhat larger than that in a case where the anode support structure is adopted. On the other hand, an increase in the thickness of the solid electrolyte layer may cause an increase in electric resistance and a decrease in ionic conductivity. However, with the progress of material technology in recent years, setting the solid electrolyte layer to have a larger thickness does not result in a significant decrease in electrical conductivity and ionic conductivity. In the present embodiment, the solid electrolyte layer is preferably set to have a thickness of 0.1 to 1 mm in order to secure the strength of the solid electrolyte layer.

The material constituting the solid electrolyte layer is not particularly limited, and any solid electrolyte material constituted of a variety of materials can be adopted as long as it is formed by a firing method. For example, LSGM (lanthanum gallate), YSZ (Yttria Stabilized Zirconia), GDC (Gadolinium Doped Ceria), or the like can be adopted.

The material constituting the cathode layer is also not particularly limited, and any material can be adopted as long as it can be fired after being stacked on the solid electrolyte layer. For example, SSC ($Sm_{0.5}Sr_{0.5}CoO_3$), LSCF (Lanthanum Strontium Cobalt Ferrite), or the like can be adopted.

Further, there can also be adopted a configuration in which the strength of a solid electrolyte-cathode stacked body is increased by setting the cathode layer to have an increased thickness or strength.

The anode layer in accordance with the present embodiment can be configured to include a variety of porous anode members having electrical conductivity and capable of serving as an anode electrode and also as a current collector when being pressed against the solid electrolyte layer. For example, a porous body constituted of carbon fibers or the like, or a metal porous body constituted of Ni or the like can be adopted. By adopting a metal porous body as a porous anode member, high heat resistance and electrical conductivity can be secured.

Further, as the porous anode member, a member which can be pressed against the solid electrolyte layer in a state where its solid electrolyte layer side is compressively deformed by a predetermined amount is preferably adopted, such that required electrical conductivity can be exhibited and a large force is not exerted on a local portion of the solid electrolyte layer or the like when the porous anode member is stacked to be pressed against the solid electrolyte layer. For example, the porous anode member can be constituted of a sheet-shaped porous body having a high porosity. When the sheet-shaped porous body having a high porosity is compressed from both side surfaces, the sheet-shaped porous body is significantly deformed in the vicinity of the compressed surfaces. In particular, in the case of a metal porous body, with an increase in compressive force, plastic deformation occurs from the vicinity of the compressed surfaces. The occurrence of plastic deformation in the vicinity of an interface in contact with the solid electrolyte layer prevents a large force from being locally exerted, and thereby the compressive force exerted on the solid electrolyte layer is uniformized and damage to the solid electrolyte layer can be prevented. Further, since contact pressure can be uniformized, good electrical conductivity can be secured throughout the surface of the solid electrolyte layer. Furthermore, since the metal porous body is stacked in a state where a portion thereof in contact with the solid electrolyte layer is collapsed, its contact area with respect to the solid electrolyte layer is increased and its contact resistance is decreased, leading to an increase in electrical conductivity.

On the other hand, since the porosity of an intermediate portion in a thickness direction is higher than that in the vicinity of the interface, a significant decrease in gas flow resistance does not occur. In order to secure required electrical conductivity, it is preferable to stack the porous anode member such as a metal porous body to be pressed in a state where deformation in the thickness direction including elastic deformation and plastic deformation is 2 to 10%. It is also preferable that the porous anode member is stacked on the solid electrolyte layer in a state where the porous anode member is compressively deformed by being pressed against the solid electrolyte layer at a pressure of 5 to 50 N/cm$^2$.

The porous anode member can be constituted of a metal porous body having electrical conductivity. As the metal porous body, a metal porous body formed of a variety of materials having electrical conductivity can be adopted. For example, the metal porous body can be formed of a material selected from nickel (Ni), a nickel (Ni)-tin (Sn) alloy, a nickel (Ni)-tin (Sn)-chromium (Cr) alloy, a ferrite-based stainless alloy, an inconel (Ni-base) alloy, and the like.

The form of the metal porous body is also not particularly limited. For example, a metal porous body in the shape of a sheet formed by knitting or interlacing metal fibers can be adopted.

Further, as the metal porous body, a metal porous body that includes a skeleton having outer shells and a core portion made of one or both of a hollow material or an electrically conductive material, and includes a three-dimensional network structure in which the skeleton integrally continues, can be adopted.

A porous base material including a three-dimensional network structure can have a high porosity, and also has a high electrical conductivity because its skeleton integrally continues. When the porous base material including a three-dimensional network structure is used, pores can be formed with a uniform pore diameter. Accordingly, gas flow resistance can be reduced, and the efficiency of the fuel cell can be improved. Further, when the porous base material including a three-dimensional network structure is used, porosity and pore diameter can be easily adjusted. Accordingly, the porous base material can secure the function of diffusing gas to the solid electrolyte layer, and can serve as a gas flow channel. In addition, when the porous base material including a three-dimensional network structure is used, the porous base material, upon being compressively deformed, is plastically deformed in the vicinity of a compressed surface. Accordingly, the porous base material can obtain a high electrical conductivity while preventing a large force from being exerted on a local portion of the solid electrolyte layer.

The porous anode member can be stacked to be directly pressed against the surface of the solid electrolyte layer, or can be stacked to be pressed against the surface of the solid electrolyte layer with a member formed of a variety of electrically conductive materials being interposed therebetween. For example, the porous anode member can be stacked to be pressed against the surface of the solid electrolyte layer with a soft porous body or powder having a higher electrical conductivity being interposed therebetween. For example, the porous anode member can be stacked to be pressed against the surface of the solid electrolyte layer with silver powder, silver paste, or the like being interposed therebetween.

The technique of holding the stacked state of the porous anode member is also not particularly limited. For example, the porous anode member can be pressed against the surface of the solid electrolyte layer with a constituent member of the fuel cell, such as a separator, being interposed therebetween.

When the porous anode member is assembled into the fuel cell, the porous anode member can be stacked to be pressed against the solid electrolyte layer, or the porous anode member can be held beforehand in a stacked state on the surface of the solid electrolyte layer and then a pressing force can be exerted thereon during assembly. For example, the solid electrolyte layer and the porous anode member can be temporarily fixed with an adhesive component such as silver paste, and then a pressing force can be exerted thereon when they are assembled into the fuel cell.

The porous anode member can be provided with a surface coating layer for improving corrosion resistance and electrical conductivity. The technique of providing the surface coating layer is not particularly limited, and the surface coating layer can be formed for example by a plating method or the like. For example, manganese cobalt plating or cobalt nickel plating can be applied. Thereby, performance and durability of the fuel cell can be improved.

The porous anode member can also be caused to hold a catalytic component. For example, a catalytic component such as: a single metal such as Ni, Fe, Co, Ag, Pt, or Pd, or an alloy thereof; a single ionic conductor such as YSZ (Yttria Stabilized Zirconia), GDC (Gadolinium Doped Ceria), LSGM (lanthanum gallate), SSZ (Scandia Stabilized Zirconia), BCY (Yttrium-doped Barium Cerate), or BZY (Yttrium-doped Barium Zirconate), or a composite thereof; or a composite of a metal or an alloy and an ionic conductor can be held in pores of the porous anode member. Thereby, power generation performance of the fuel cell can be improved.

The membrane electrode assembly can be manufactured by a method including a solid electrolyte layer formation step of forming the solid electrolyte layer, a cathode layer formation step of forming the cathode layer on the other side of the solid electrolyte layer, the step of preparing the porous anode member, and an anode member stacking step of stacking the porous anode member on a porous anode member side of the solid electrolyte layer to be pressed thereagainst. In the present embodiment, the porous anode member can also serve as a current collector. Further, there is no need to sinter the anode layer together with the solid electrolyte layer. Accordingly, the number of parts and manufacturing steps are reduced.

The solid electrolyte layer formation step can include a variety of techniques and steps. The solid electrolyte layer formation step can include, for example, the step of compression-molding a powder-shaped solid electrolyte material, and the step of firing the compression-molded solid electrolyte material.

The cathode layer formation step can be performed by applying a cathode layer formation material by a predetermined thickness onto one surface of the fired solid electrolyte layer, and firing the cathode layer formation material. Since the cathode material can be fired at a temperature lower than the firing temperature of the solid electrolyte material, there is no possibility that the solid electrolyte material may be deformed or the like. Further, the cathode material can also be applied onto a surface of a solid electrolyte material molded body before being fired, and then fired simultaneously.

The step of preparing the porous anode member can include a variety of steps depending on the porous material adopted for the anode layer. For example, the step of preparing the porous anode member can include the step of forming a sheet-shaped porous anode member by knitting or interlacing fibers having electrical conductivity.

Alternatively, the step of preparing the porous anode member can include the step of manufacturing a metal porous body that includes a skeleton having outer shells and a core portion made of one or both of a hollow material or an electrically conductive material, and includes a three-dimensional network structure in which the skeleton integrally continues. The step of preparing the porous anode member may be the step of preparing a commercially available product. As the commercially available product, for example, a metal porous body manufactured by Sumitomo Electric Industries (registered trademark: Celmet) can be adopted.

For example, when a metal porous body constituted of Ni is manufactured, the step of preparing the porous anode member can include the step of performing electrical conduction treatment on a three-dimensional network-shaped resin porous base material to form an electrically conductive layer in a surface thereof, an Ni-plated layer formation step of forming an Ni-plated layer on the electrically conductive layer, a base material disappearance step of making the resin porous base material disappear in an atmosphere in which at least oxygen is present, and a reduction step of subjecting the remaining layers to a temperature of 300° C. to 1100° C. in a reducing atmosphere.

The metal porous body having the above structure can have a high porosity, because its skeleton has a three-dimensional network structure. Further, with the metal porous body having the above structure, a metal porous body having a required porosity can be easily formed. In addition, since the metal porous body can be formed to have pores with a substantially constant pore diameter, the metal porous body has a high gas diffusivity, and can cause gas to uniformly act on the solid electrolyte layer. The metal porous body having a high porosity can serve not only as an anode layer but also as a gas flow channel.

Further, as the metal porous body, a metal porous body which can be easily deformed is preferably adopted, such that electrical conductivity is increased and the solid electrolyte layer is not damaged when the metal porous body is pressed against the solid electrolyte layer. Since the metal porous body having the above three-dimensional network structure has a constant pore diameter, a pressing force does not concentrate on a local portion of the solid electrolyte layer. In addition, by setting the metal porous body to have a small basis weight, a metal porous body which can be easily deformed in the vicinity of its surface in contact with the solid electrolyte layer can be obtained. For example, it is preferable to adopt a metal porous body having a basis weight of 200 to 500 g/m$^2$.

Since the fuel cell is operated at a high temperature, a member constituting the anode layer preferably has a predetermined corrosion resistance in order to improve durability. In this case, the step of preparing the porous anode member can include the step of forming a metal porous body and the step of forming a coating layer on a surface of the metal porous body. For example, the step of preparing the porous anode member can include the step of plating the metal porous body with a corrosion-resistant metal or the like, or an alloying step for improving corrosion resistance. For example, the step of preparing the porous anode member can include a plating step of applying manganese cobalt plating or cobalt nickel plating to the metal porous body. Further, the step of preparing the porous anode member can also include, for example, the step of performing alloying with Sn on the metal porous body, in order to improve corrosion resistance.

In addition, as described above, the step of preparing the porous anode member can include the step of causing the porous anode member to hold a catalyst.

The anode member stacking step can be performed with a variety of techniques. For example, in the step of assembling the fuel cell, the porous anode member can be stacked on the solid electrolyte layer to be pressed thereagainst, using a separator or the like. Further, before being assembled into the fuel cell, the porous anode member can be stacked on the solid electrolyte layer to be pressed thereagainst, using a jig or the like. In this case, the anode layer (porous anode member) and the solid electrolyte layer can be temporarily fixed with an adhesive component such as silver paste, and held in a stacked state.

In the anode member stacking step, the porous anode member is preferably stacked to be deformed at least in the vicinity of the solid electrolyte layer. This can increase electrical conductivity with the solid electrolyte layer, and improve performance of the fuel cell. Further, this can decrease the porosity of the porous anode member on the solid electrolyte layer side, and can increase the action of diffusing gas in the vicinity of the solid electrolyte layer.

[Details of Embodiment of Present Invention]

Hereinafter, details of an embodiment will be described based on the drawings.

Figure 2:
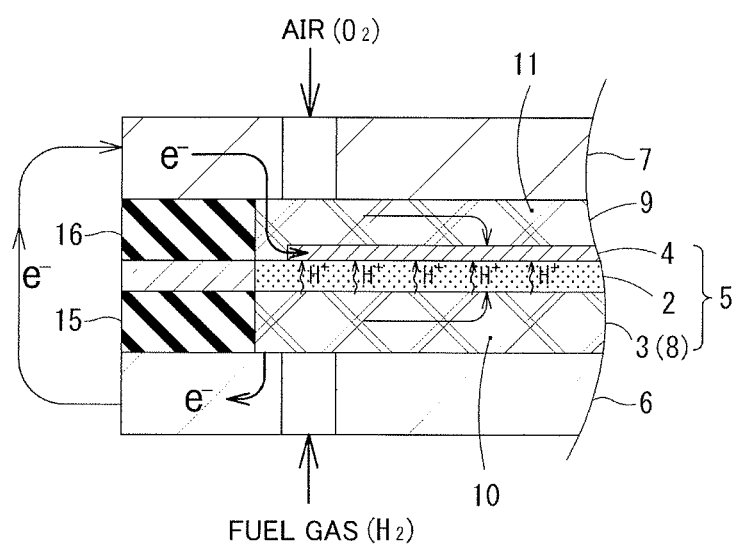
FIG. 2 is an enlarged cross sectional view of a main portion in FIG. 1.

FIGS. 1 and 2 conceptually show a cell structure (fuel cell unit) 101 of a solid oxide fuel cell. It should be noted that, although FIG. 1 shows one cell structure, a fuel cell is generally composed by stacking a plurality of cell units in a thickness direction to increase a voltage for power generation.

Fuel cell unit 101 includes a membrane electrode assembly 5 having a cathode layer 4 as an air electrode and an anode layer 3 as a fuel electrode, with a solid electrolyte layer 2 being sandwiched therebetween. Solid electrolyte layer 2 can be constituted of, for example, LSGM (lanthanum gallate), YSZ (Yttria Stabilized Zirconia), GDC (Gadolinium Doped Ceria), or the like.

Cathode layer 4 in accordance with the present embodiment is formed by integrally firing a cathode material in a predetermined region on one side of solid electrolyte layer 2. On the other hand, anode layer 3 is provided by stacking a porous anode member 8 made of a metal porous body on the other side of solid electrolyte layer 2 to be pressed thereagainst.

On the outside of cathode layer 4 of membrane electrode assembly 5, a current collecting member 7 is provided, with a current collector 9 made of a metal porous body being interposed therebetween. Current collector 9 is constituted of a metal porous body having a high porosity, and serves as a gas flow channel 11.

On the outside of anode layer 3 of membrane electrode assembly 5, a current collecting member 6 is provided to be directly stacked on anode layer 3. In the present embodiment, anode layer 3 is constituted of a metal porous body, and thereby serves as a gas flow channel 10 and also as a current collector.

Current collector 9 and porous anode member 8 are constituted of porous bodies having electrical conductivity, and diffuse gases flowing through gas flow channels 10, 11 provided in these members to cathode layer 4 and solid electrolyte layer 2 to act thereon. Current collector 9 is configured to electrically connect cathode layer 4 and current collecting member 7 for electrical conduction therebetween. Further, porous anode member 8 is configured to electrically connect solid electrolyte layer 2 and current collecting member 6 for electrical conduction therebetween.

Fuel cell unit 101 is composed by stacking current collector 9, current collecting member 7, porous anode member 8, and current collecting member 6 on both sides of membrane electrode assembly 5, and sealing peripheral edge portions with gaskets 15, 16.

Air containing oxygen as an oxidizer is introduced into gas flow channel 11, and oxygen is supplied to cathode layer 4 through current collector 9. A fuel gas containing hydrogen as a fuel is introduced into gas flow channel 10, and hydrogen is supplied to solid electrolyte layer 2 through porous anode member 8 which serves as anode layer 3.

In anode layer 3, in the vicinity of the solid electrolyte layer, a reaction represented by $H_2 \rightarrow 2H^+ + 2e^-$ occurs. On the other hand, in cathode layer 4, a reaction represented by $\frac{1}{2}O_2 + 2H^+ + 2e^- \rightarrow H_2O$ occurs. Thereby, hydrogen ions move from anode layer 3, through solid electrolyte layer 2, to cathode layer 4, and electrons flow from porous anode member 8 to current collecting member 6, current collecting member 7, current collector 9, and cathode layer 4, and thus electric power is obtained. It should be noted that fuel cell unit 101 is heated to a predetermined temperature with a heating device not shown.

In FIG. 1, solid electrolyte layer 2 and cathode layer 4 are illustrated to be thicker than in reality for ease of understanding.

Cathode layer 4 can be constituted of, for example, SSC ($Sm_{0.5}Sr_{0.5}CoO_3$), LSCF (Lanthanum Strontium Cobalt Ferrite), LSM (Lanthanum Strontium Manganate), BSCF (BaSrCoFe-based oxide), or the like. Further, current collector 9 can be constituted of a variety of porous bodies having electrical conductivity. For example, current collector 9 can also be constituted of the same metal porous body as that for porous anode member 8.

Cathode layer 4 is an oxygen electrode, and its vicinity serves as a strong corrosive environment. Accordingly, cathode layer 4 and current collector 9 are preferably formed of materials having a high corrosion resistance. On the other hand, anode layer 3 is a fuel electrode, and its vicinity serves as a reducing atmosphere. Accordingly, porous anode member 8 is not required to be as corrosion resistant as cathode layer 4. In the present embodiment, anode layer 3 is composed by stacking porous anode member 8 made of a metal porous body on solid electrolyte layer 2 to be pressed thereagainst.

Since solid electrolyte layer 2 and anode layer 3 are not integrally tired in the present embodiment, there occurs no reaction between constituent materials at a boundary surface between these layers during a firing step and the like, preventing an increase in electric resistance and a decrease in ionic conductivity.

Further, since there is no need to fire solid electrolyte layer 2 together with anode layer 3, manufacturing steps can be reduced. Furthermore, since anode layer 3 can also serve as a current collector, the number of parts can also be reduced.

Figure 3:
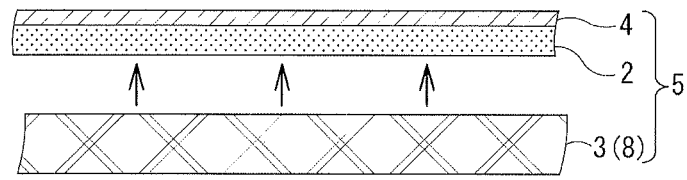
FIG. 3 is a cross sectional view showing a stacked form of a membrane electrode assembly in accordance with one embodiment.

Furthermore, as shown in FIG. 3, anode layer 3 is stacked on solid electrolyte layer 2 to be pressed thereagainst. Therefore, even when there is a large difference in thermal expansion coefficient and the like between these members, there is no possibility that a crack or the like resulting from the thermal expansion coefficient and the like may occur as in the case of integral firing, and thus a high-quality fuel cell can be configured.

Moreover, there is also no need to set behaviors during firing, thermal expansion coefficients, and the like of the materials constituting solid electrolyte layer 2 and anode layer 3 to be identical. Accordingly, the range of choices for the materials constituting solid electrolyte layer 2 and anode layer 3 is significantly widened. As a result, solid electrolyte layer 2 and anode layer 3 can be constituted of optimal materials, and performance of fuel cell unit 101 and the fuel cell including the same can also be improved.

EXAMPLES

Example 1

(Manufacturing Steps and Configuration of Fuel Cell Unit)

(1) Solid Electrolyte Layer Formation Step

Figure 4:
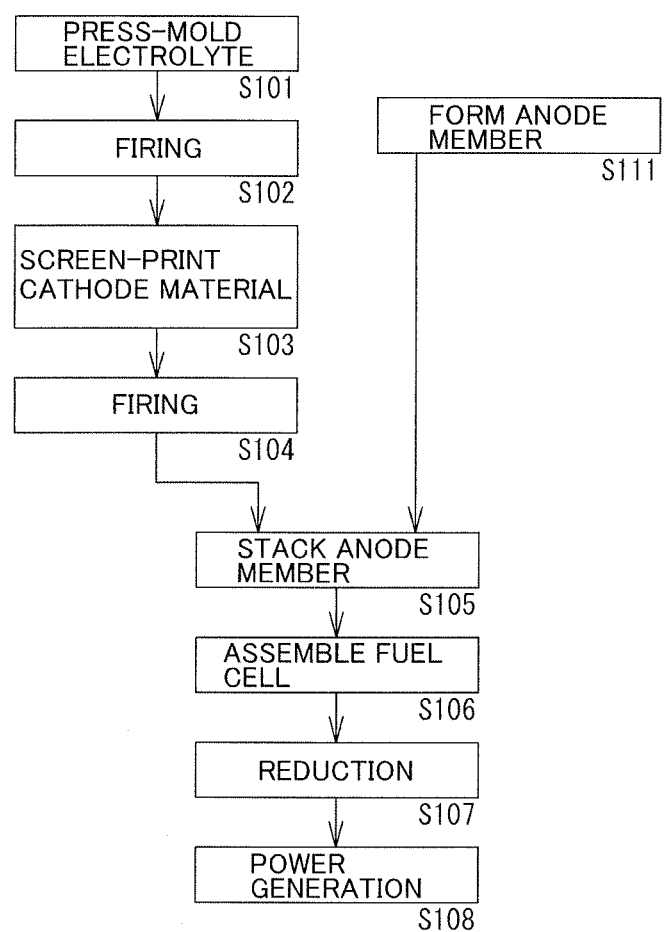
FIG. 4 is a flowchart showing a method for manufacturing a membrane electrode assembly and a fuel cell unit in accordance with Example 1.

As shown in FIG. 4, a solid electrolyte material (LSGM: lanthanum gallate) was press-molded (S101 in FIG. 4) to form a plate-shaped solid electrolyte molded body, which was fired at 1500° C. for 5 hours (S102 in FIG. 4) to form 300-μm-thick plate-shaped solid electrolyte layer 2.

(2) Cathode Layer Formation Step

A cathode material (SSC: $Sm_{0.5}Sr_{0.5}CoO_3$) was applied onto the fired solid electrolyte molded body by screen printing (S103 in FIG. 4), and firing was performed thereon at 950° C. for 0.5 hours (S104 in FIG. 4) to form 40-μm-thick cathode layer 4 integrally with solid electrolyte layer 2.

(3) Porous Anode Member Formation Step

With the technique described above, a metal porous body having a three-dimensional network structure was formed from nickel to form porous anode member 8 (S111 in FIG. 4). Porous anode member 8 had a porosity of 96%, a thickness of 1 mm, and a basis weight of 400 g/m$^2$.

(4) Anode Member Stacking Step

Fuel cell unit 101 was assembled by stacking current collecting member 7, current collector 9, solid electrolyte layer 2 provided with cathode layer 4, porous anode member 8, and current collecting member 6, and pressing porous anode member 8 against solid electrolyte layer 2 (S105 and S106 in FIG. 4). Porous anode member 8 was stacked on solid electrolyte layer 2 with its thickness being decreased by 5% due to a pressing force. Porous anode member 8 was stacked to be pressed in a state where plastic deformation occurred in the vicinity of interfaces with solid electrolyte layer 2 and current collecting member 6.

(Overview of Performance Test)

Obtained fuel cell unit 101 was heated to 1000° C. to be reduced (S107 in FIG. 4), and thereafter a performance test was conducted with each of hydrogen gas ($H_2$ 100%) and air being introduced at 100 cc/min (S108 in FIG. 4).

(Test Result)

Figure 7:
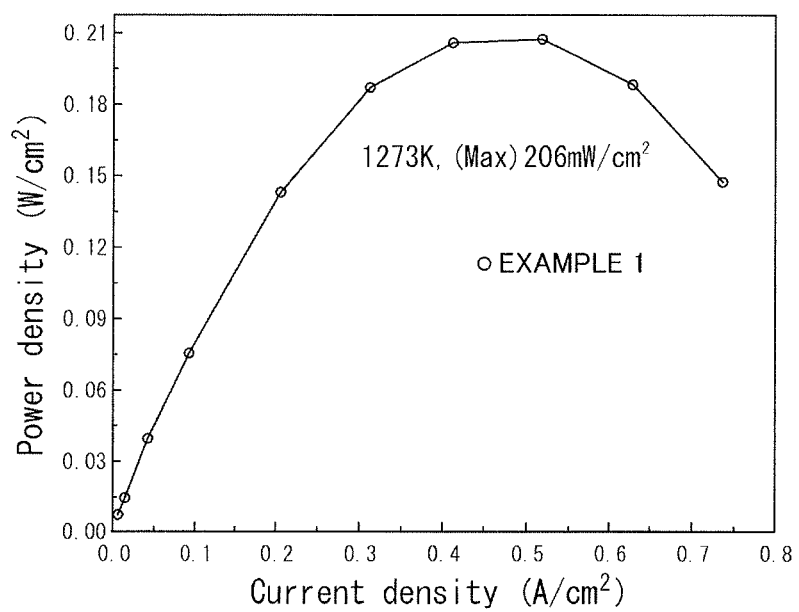
FIG. 7 is a graph showing performance of the fuel cell unit composed using the membrane electrode assembly in accordance with Example 1.

As shown in FIG. 7, the fuel cell unit using a membrane electrode assembly in accordance with Example 1 was able to obtain an output of 206 mW/cm$^2$. In particular, it was able to confirm that an output sufficient as an SOFC is obtained by stacking porous anode member 8 on solid electrolyte layer 2 to be pressed thereagainst as described above.

Example 2

(Manufacturing Steps and Configuration of Fuel Cell Unit)

(1) Solid Electrolyte Layer Formation Step

Figure 5:
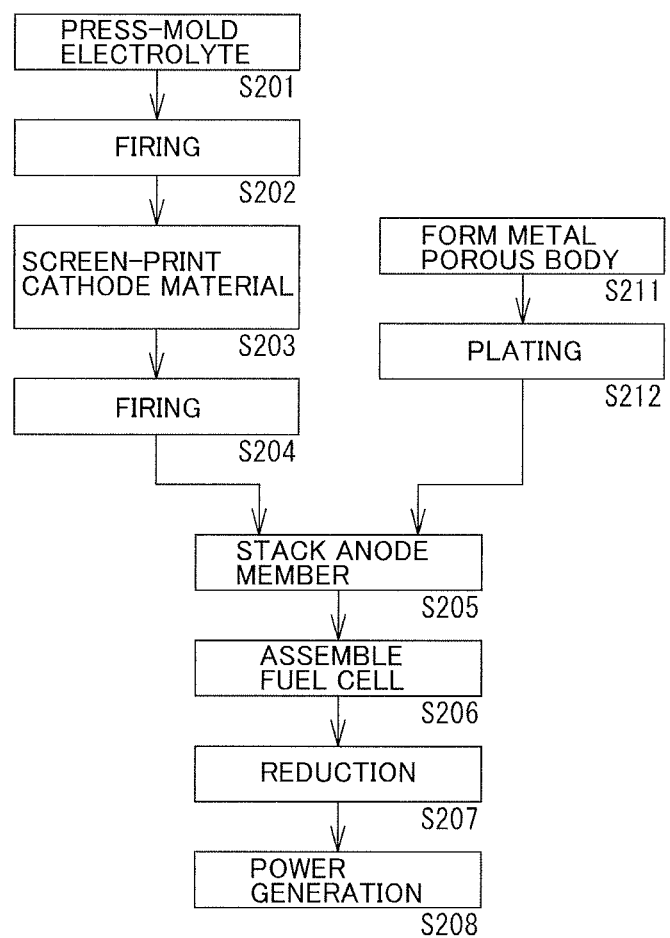
FIG. 5 is a flowchart showing a method for manufacturing membrane electrode assemblies and fuel cell units in accordance with Examples 2 and 3.

Solid electrolyte layer 2 having the same configuration as that in Example 1 was formed by the same step as that in Example 1 (S201 to S202 in FIG. 5).

(2) Cathode Layer Formation Step

Cathode layer 4 having the same configuration as that in Example 1 was formed by the same step as that in Example 1 (S203 to S204 in FIG. 5).

(3) Porous Anode Member Formation Step

A metal porous body having the same configuration as that in Example 1 was formed with the same technique as that in Example 1 (S211 in FIG. 5). This metal porous body was plated with 5-μm-thick Co—Ni plating to obtain porous anode member 8 (S212 in FIG. 5). It should be noted that the component composition of the above Co—Ni plating was set such that the mass ratio of the Co component to the Ni component was 3 to 1.

(4) Anode Member Stacking Step

As in Example 1, fuel cell unit 101 was assembled, with porous anode member 8 being pressed against solid electrolyte layer 2 (S205, S206 in FIG. 5). Porous anode member 8 was stacked on solid electrolyte layer 2 with its thickness being decreased by 5% due to a pressing force. As in Example 1, porous anode member 8 was stacked to be pressed in a state where plastic deformation occurred in the vicinity of interfaces with solid electrolyte layer 2 and current collecting member 6.

(Overview of Performance Test)

Obtained fuel cell unit 101 was heated to 1000° C. to be reduced (S207 in FIG. 5), and a performance test was conducted (S208 in FIG. 5). The performance test was conducted under the same conditions as those in Example 1.

(Test Result)

Figure 8:
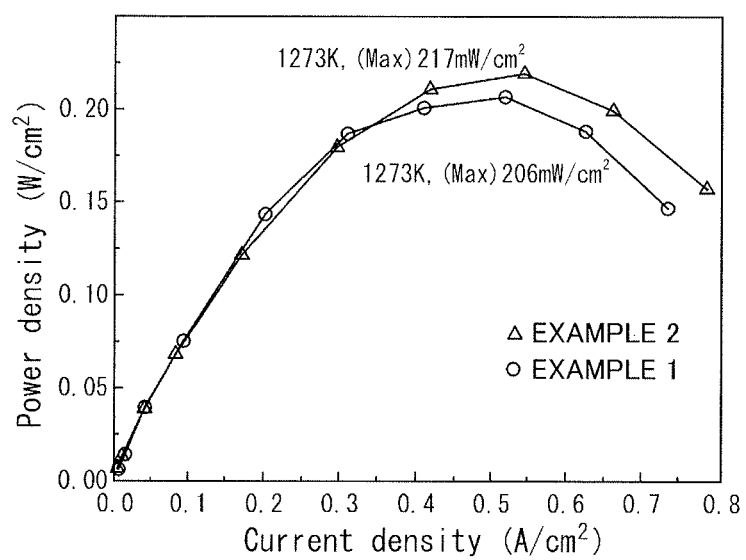
FIG. 8 is a graph showing performance of the fuel cell unit composed using the membrane electrode assembly in accordance with Example 2 in comparison with the performance of the fuel cell unit composed using the membrane electrode assembly in accordance with Example 1.

As shown in FIG. 8, the fuel cell unit using a membrane electrode assembly in accordance with Example 2 was able to obtain an output of 217 mW/cm$^2$. Further, FIG. 8 also shows the performance curve of the fuel cell unit using the membrane electrode assembly in accordance with Example 1. The output of the fuel cell unit using the membrane electrode assembly in accordance with Example 2 was higher than the output of the fuel cell unit using the membrane electrode assembly in accordance with Example 1 (206 mW/cm$^2$). This is considered to be because the Co—Ni plating increases electrical conductivity and improves the catalytic activity in porous anode member 8.

Example 3

(Manufacturing Steps and Configuration of Fuel Cell Unit)

(1) Solid Electrolyte Layer Formation Step

Solid electrolyte layer 2 having the same configuration as that in Example 1 was formed by the same step as that in Example 1 (S201 to S202 in FIG. 5).

(2) Cathode Layer Formation Step

Cathode layer 4 having the same configuration as that in Example 1 was formed by the same step as that in Example 1 (S203 to S204 in FIG. 5).

(3) Porous Anode Member Formation Step

A metal porous body having the same configuration as that in Example 1 was formed with the same technique as that in Example 1 (S211 in FIG. 5). This metal porous body was plated with 5-μm-thick Mn—Co plating to obtain porous anode member 8 (S212 in FIG. 5). It should be noted that the component composition of the above Mn—Co plating was set such that the mass ratio of the Mn component to the Co component was 9 to 1.

(4) Anode Member Stacking Step

As in Example 1, fuel cell unit 101 was assembled, with porous anode member 8 being pressed against solid electrolyte layer 2 (S205, S206 in FIG. 5). Porous anode member 8 was stacked on solid electrolyte layer 2 with its thickness being decreased by 5% due to a pressing force. As in Example 1, porous anode member 8 was stacked to be pressed in a state where plastic deformation occurred in the vicinity of interfaces with solid electrolyte layer 2 and current collecting member 6.

(Overview of Performance Test)

Obtained fuel cell unit 101 was heated to 1000° C. to be reduced (S207 in FIG. 5), and a performance test was conducted (S208 in FIG. 5). The performance test was conducted under the same conditions as those in Example 1.

(Test Result)

Figure 9:
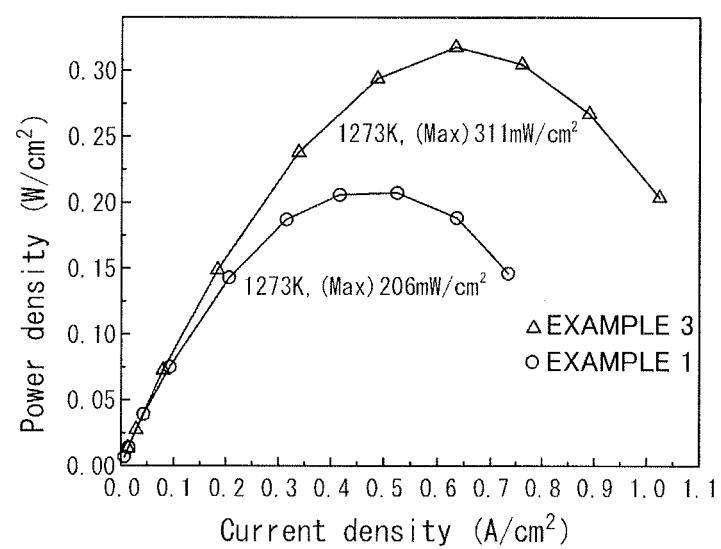
FIG. 9 is a graph showing performance of the fuel cell unit composed using the membrane electrode assembly in accordance with Example 3 in comparison with the performance of the fuel cell unit composed using the membrane electrode assembly in accordance with Example 1.

As shown in FIG. 9, the fuel cell unit using a membrane electrode assembly in accordance with Example 3 was able to obtain an output of 311 mW/cm$^2$. Further, FIG. 9 also shows the performance curve of the fuel cell unit using the membrane electrode assembly in accordance with Example 1. The output of the fuel cell unit using the membrane electrode assembly in accordance with Example 3 was higher than the output of the fuel cell unit using the membrane electrode assembly in accordance with Example 1 (206 mW/cm$^2$). This is considered to be because the Mn—Co plating increases electrical conductivity and improves the catalytic activity in porous anode member 8. Further, the output of the fuel cell unit using the membrane electrode assembly in accordance with Example 3 was higher than the output of the fuel cell unit in accordance with Example 2 shown in FIG. 8. This is considered to be because the catalytic activity of the Mn—Co plating is higher than the catalytic activity of the Co—Ni plating.

Example 4

(Manufacturing Steps and Configuration of Fuel Cell Unit)

(1) Solid Electrolyte Layer Formation Step

Figure 6:
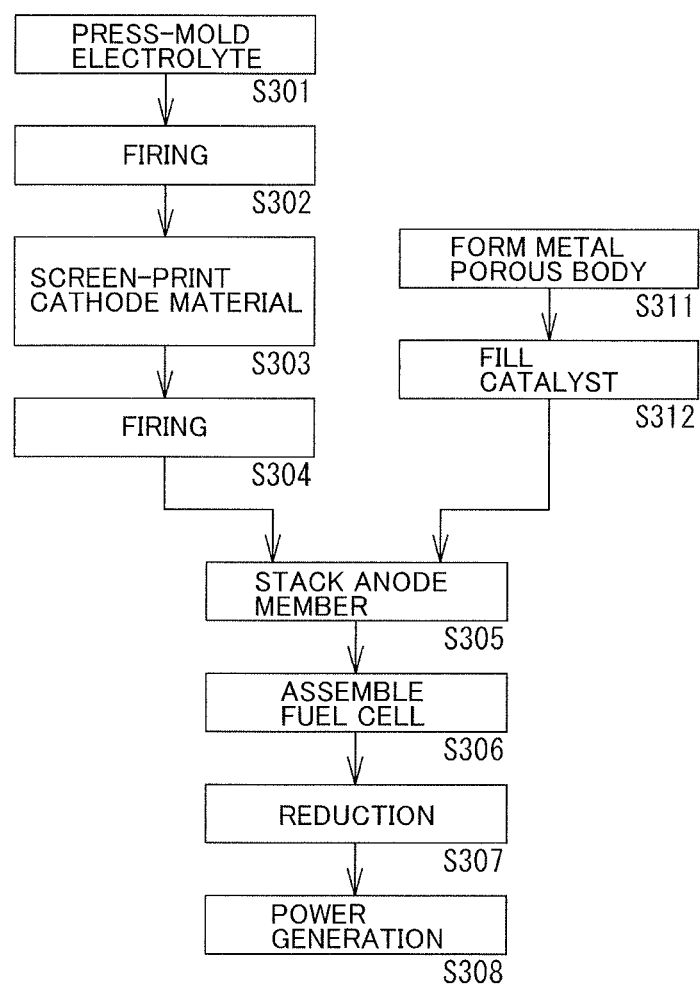
FIG. 6 is a flowchart showing a method for manufacturing a membrane electrode assembly and a fuel cell unit in accordance with Example 4.

Solid electrolyte layer 2 having the same configuration as that in Example 1 was formed by the same step as that in Example 1 (S301 to S302 in FIG. 6).

(2) Cathode Layer Formation Step

Cathode layer 4 having the same configuration as that in Example 1 was formed by the same step as that in Example 1 (S303 to S304 in FIG. 6).

(3) Porous Anode Member Formation Step

A metal porous body having the same configuration as that in Example 1 was formed with the same technique as that in Example 1 (S311 in FIG. 6). This metal porous body was filled with a catalyst made of NiO (S312 in FIG. 6). The catalyst had an average particle diameter of 1 μm, and the fill amount was set to 80 to 90 vol %.

(4) Anode Member Stacking Step

As in Example 1, fuel cell unit 101 was assembled, with porous anode member 8 being pressed against solid electrolyte layer 2 (S305, S306 in FIG. 6). Porous anode member 8 was stacked on solid electrolyte layer 2 with its thickness being decreased by 5% due to a pressing force. As in Example 1, porous anode member 8 was stacked to be pressed in a state where plastic deformation occurred in the vicinity of interfaces with solid electrolyte layer 2 and current collecting member 6.

(Overview of Performance Test)

Obtained fuel cell unit 101 was heated to 1000° C. to be reduced (S307 in FIG. 6), and a performance test was conducted (S308 in FIG. 6). The performance test was conducted under the same conditions as those in Example 1.

(Test Result)

Figure 10:
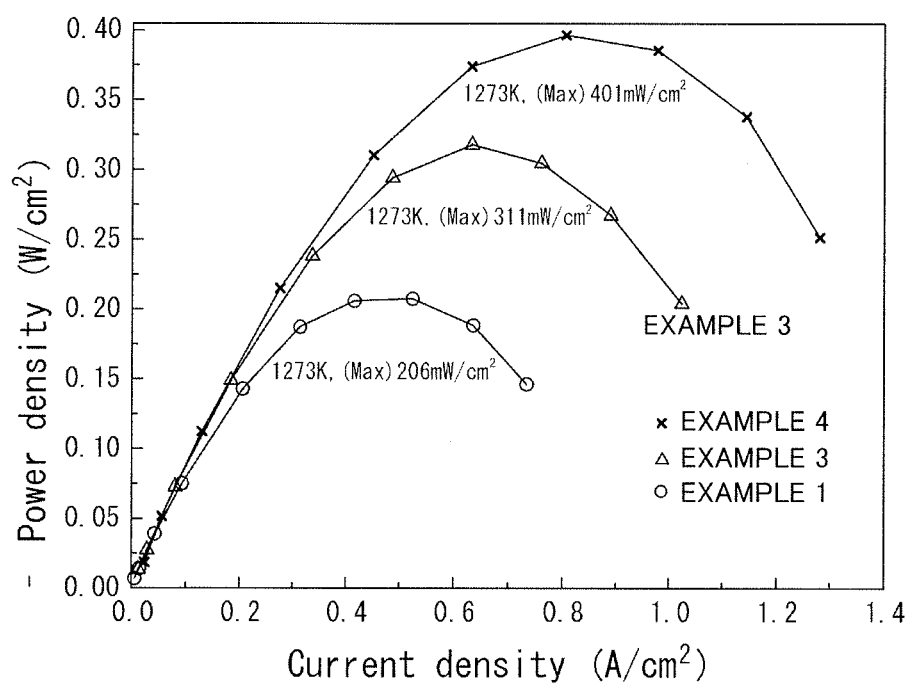
FIG. 10 is a graph showing performance of the fuel cell unit composed using the membrane electrode assembly in accordance with Example 4 in comparison with the performance of the fuel cell unit composed using the membrane electrode assembly in accordance with Example 1 and the performance of the fuel cell unit composed using the membrane electrode assembly in accordance with Example 3.

As shown in FIG. 10, the fuel cell unit using a membrane electrode assembly in accordance with Example 4 was able to obtain an output of 401 mW/cm². Further, FIG. 10 also shows the performance curve of the fuel cell unit using the membrane electrode assembly in accordance with Example 1, and the performance curve of the fuel cell unit using the membrane electrode assembly in accordance with Example 3. The output of the fuel cell unit using the membrane electrode assembly in accordance with Example 4 was higher than the outputs of the fuel cell units using the membrane electrode assemblies in accordance with Examples 1 and 3 (206 mW/cm² and 311 mW/cm², respectively). This is considered to be because the filled NiO is reduced during power generation and has a high activity as a catalyst.

It should be understood that the embodiment and examples disclosed herein are illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

2: solid electrolyte layer; 3: anode layer; 4: cathode layer; 5: membrane electrode assembly; 6: current collecting member; 7: current collecting member; 8: porous anode member; 9: current collector; 10: gas flow channel; 11: gas flow channel; 15: gasket; 16: gasket; 101 fuel cell unit.

The invention claimed is:

1. A membrane electrode assembly, comprising:
   a solid electrolyte layer;
   an anode layer provided on one side of the solid electrolyte layer; and
   a cathode layer provided on the other side of the solid electrolyte layer,
   the anode layer being stacked on the solid electrolyte layer to be pressed thereagainst,
   the anode layer including a porous anode member having electrical conductivity,
   wherein the porous anode member is stacked to be directly pressed against the surface of the solid electrolyte layer, and
   wherein the porous anode member is constituted of a metal porous body having electrical conductivity.

2. The membrane electrode assembly according to claim 1, wherein the porous anode member is stacked on the solid electrolyte layer to be pressed thereagainst in a state where the porous anode member is compressively deformed by a predetermined amount.

3. The membrane electrode assembly according to claim 2, wherein the porous anode member is plastically deformed at least in a vicinity of an interface in contact with the solid electrolyte layer.

4. The membrane electrode assembly according to claim 1, wherein the porous anode member is constituted of a metal porous body having electrical conductivity which is plated with manganese cobalt plating or cobalt nickel plating.

5. The membrane electrode assembly according to claim 1, further comprising a catalytic component held in the porous anode member.

6. A fuel cell, comprising the membrane electrode assembly according to claim 1.

7. A membrane electrode assembly, comprising:
   a solid electrolyte layer;
   an anode layer provided on one side of the solid electrolyte layer; and
   a cathode layer provided on the other side of the solid electrolyte layer,
   the anode layer being stacked on the solid electrolyte layer to be pressed thereagainst,
   the anode layer including a porous anode member having electrical conductivity,
   wherein the porous anode member is stacked to be directly pressed against the surface of the solid electrolyte layer,
   wherein the porous anode member is constituted of a metal porous body having electrical conductivity, and
   wherein the porous anode member is stacked on the solid electrolyte layer in a state where the porous anode member is compressively deformed by being pressed against the solid electrolyte layer at a pressure of 5 to 50 N/cm².

8. A membrane electrode assembly, comprising:
   a solid electrolyte layer;
   an anode layer provided on one side of the solid electrolyte layer; and
   a cathode layer provided on the other side of the solid electrolyte layer,
   the anode layer being stacked on the solid electrolyte layer to be pressed thereagainst,
   the anode layer including a porous anode member having electrical conductivity,
   wherein the porous anode member is stacked to be directly pressed against the surface of the solid electrolyte layer,
   wherein the porous anode member is constituted of a metal porous body having electrical conductivity, and
   the metal porous body includes a skeleton having outer shells and a core portion made of one or both of a hollow material or an electrically conductive material, and includes a three-dimensional network structure in which the skeleton integrally continues.

9. A membrane electrode assembly, comprising:
   a solid electrolyte layer;
   an anode layer provided on one side of the solid electrolyte layer; and
   a cathode layer provided on the other side of the solid electrolyte layer,
   the anode layer being stacked on the solid electrolyte layer to be pressed thereagainst,
   the anode layer including a porous anode member having electrical conductivity,
   wherein the porous anode member is stacked to be directly pressed against the surface of the solid electrolyte layer,
   wherein the porous anode member is constituted of a metal porous body having electrical conductivity, and
   the metal porous body is formed of a material selected from nickel (Ni), a nickel (Ni)-tin (Sn) alloy, a nickel (Ni)-tin (Sn)-chromium (Cr) alloy, a ferrite-based stainless alloy, and a Ni-base alloy.

10. A method for manufacturing a membrane electrode assembly including a solid electrolyte layer, an anode layer provided on one side of the solid electrolyte layer, and a cathode layer provided on the other side of the solid electrolyte layer, comprising the steps of:
    forming the solid electrolyte layer;
    forming the cathode layer on the other side of the solid electrolyte layer;
    preparing a porous anode member; and stacking the porous anode member on the one side of the solid electrolyte layer to be directly pressed thereagainst, wherein the porous anode member is constituted of a metal porous body having electrical conductivity.

11. The method for manufacturing the membrane electrode assembly according to claim 10, wherein, in the step of stacking the anode member, the porous anode member is stacked to be deformed at least in a vicinity of the solid electrolyte layer.

12. The method for manufacturing the membrane electrode assembly according to claim 10, wherein the step of preparing the porous anode member includes the step of forming a metal porous body and the step of forming a coating layer on a surface of the metal porous body, wherein the porous anode member is constituted of a metal porous body having electrical conductivity which is plated with manganese cobalt plating or cobalt nickel plating.

13. The method for manufacturing the membrane electrode assembly according to claim 10, wherein the step of preparing the porous anode member includes the step of causing the porous anode member to hold a catalyst.

14. A method for manufacturing a fuel cell, comprising the method for manufacturing the membrane electrode assembly according to claim 10.

* * * * *